US012354816B2

(12) United States Patent
Mittu et al.

(10) Patent No.: US 12,354,816 B2
(45) Date of Patent: Jul. 8, 2025

(54) ACTUATION ASSEMBLY FOR A DOUBLE THROW SWITCH

(71) Applicant: ABB Schweiz AG, Baden (CH)

(72) Inventors: Mahadeva Mittu, Hyderabad (IN); Bhavya Dhruvkumar Kapadia, Thane (IN); Kiran Teertha, Hyderabad (IN); Harshada Pramod Nagare, Nashik (IN)

(73) Assignee: ABB Schweiz AG, Baden (CH)

( * ) Notice: Subject to any disclaimer, the term of this patent is extended or adjusted under 35 U.S.C. 154(b) by 265 days.

(21) Appl. No.: 17/871,671

(22) Filed: Jul. 22, 2022

(65) Prior Publication Data

US 2023/0041244 A1 Feb. 9, 2023

(30) Foreign Application Priority Data

Aug. 5, 2021 (IN) ............................ 202141035321

(51) Int. Cl.
*H01H 21/36* (2006.01)
*H01H 21/22* (2006.01)

(52) U.S. Cl.
CPC ............ *H01H 21/36* (2013.01); *H01H 21/22* (2013.01)

(58) Field of Classification Search
CPC .. H01H 21/36; H01H 21/22; H01H 2009/265; H01H 9/26; H01H 2300/018
See application file for complete search history.

(56) References Cited

U.S. PATENT DOCUMENTS

| | | | | |
|---|---|---|---|---|
| 5,397,868 | A * | 3/1995 | Smith | H01H 3/34 307/64 |
| 6,940,032 | B2 * | 9/2005 | Sirajtheen | H01H 9/0072 200/400 |
| 9,842,719 | B2 * | 12/2017 | Shea | H01H 89/04 |
| 9,865,416 | B2 * | 1/2018 | Dirks | H01H 3/26 |
| 10,083,809 | B2 * | 9/2018 | Dirks | H01H 21/24 |
| 10,818,443 | B2 * | 10/2020 | Liu | H01H 3/3052 |
| 10,923,301 | B2 | 2/2021 | Esther et al. | |
| 2019/0202257 | A1 | 7/2019 | Tucker et al. | |

FOREIGN PATENT DOCUMENTS

CN 110444417 A 11/2019

OTHER PUBLICATIONS

Intellectual Property India, Examination Report in Indian Patent Application No. 202141035321, 5 pp. (Mar. 6, 2023).

* cited by examiner

*Primary Examiner* — Vanessa Girardi
(74) *Attorney, Agent, or Firm* — Leydig, Voit & Mayer, Ltd.

(57) ABSTRACT

An actuation assembly for a double throw switch is disclosed. The assembly includes a pair of links. A distal end (D) of each of the pair of links is connectable to a first switch and a second switch of the double throw switch. A proximal end (P) of each of the pair of links includes a protuberance. Further, the assembly includes a drive disc securable to a wall of the double throw switch. The drive disc is defined with a plurality of slots of pre-defined profile. Each of the plurality of slots is structured to accommodate and guide the protuberance extending from a corresponding link of the pair of links. A lever arm is connectable to the drive disc and is operable to at least one of a first position, a neutral position, and a second position.

15 Claims, 5 Drawing Sheets

ACTUATION ASSEMBLY FOR A DOUBLE THROW SWITCH

CROSS-REFERENCE TO RELATED APPLICATIONS

This patent application claims priority to Indian patent application No. 202141035321, filed on Aug. 5, 2021, which is incorporated by reference.

FIELD OF THE DISCLOSURE

The present disclosure relates in general to linkages to control an electrical switchgear in an electrical power system. More particularly, the present disclosure relates to a double throw switch. Further, embodiments of the disclosure relate to an actuation assembly for operating the double throw switch.

BACKGROUND OF THE INVENTION

With ever-increasing reliance on electrical power in domestic and industrial applications, power outages caused due to breakdowns in electrical utility equipment's become, at the very least, extremely aggravating. Also, there will be frequent disruptions in utility electrical service due to various reasons including but not limiting to power shortage or shortage, scheduled maintenance, and the like. In view of such challenges standby electricity generating or storage equipment's are employed to act as back-up. To accommodate these alternative electrical sources supply to a common electrical load circuits, a double throw switch is commonly used. The double throw switch is normally conditioned to connect the utility source to the common load circuits, while maintaining the standby generating or storage equipment disconnected therefrom. Upon the occurrence of a power outage, the double throw switch may be reconditioned manually to first disconnect the utility source and then connect the standby source to the common load circuits. The double throw switch is manually operated by specific mechanisms to disconnect from the utility source or standby source. Such mechanism used in the conventional double throw switches are bulky and very complex. Further, the conventional double throw switch mechanisms require significantly higher parts for performing desired function.

The present disclosure is directed to overcome one or more limitations stated above.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE DISCLOSURE

One or more shortcomings of conventional systems are overcome, and additional advantages are provided through the assembly and the system as claimed in the present disclosure. Additional features and advantages are realized through the techniques of the present disclosure. Other embodiments and aspects of the disclosure are described in detail herein and are considered a part of the claimed disclosure.

In a non-limiting embodiment of the disclosure, an actuation assembly for a double throw switch is disclosed. The assembly includes a pair of links. A distal end of each of the pair of links is connectable to a first switch and a second switch of a double throw switch. A proximal end of each of the pair of links includes a protuberance extending perpendicular to a major surface of each of the pair of links. Further, the assembly includes a drive disc securable to a wall of the double throw switch. The drive disc is defined with a plurality of slots of pre-defined profile. Each of the plurality of slots is structured to accommodate and guide the protuberance extending from a corresponding link of the pair of links. A lever arm is connectable to the drive disc and the lever arm is operable to at least one of a first position, a neutral position, and a second position.

In an embodiment of the present disclosure, the pair of links include a first link connectable to the first switch and a second link connectable to the second switch. Further, the first link is connected to the first switch at an acute angle with respect to a longitudinal axis of the double throw switch.

In an embodiment of the present disclosure, the plurality of slots includes a first slot structured to accommodate the protuberance extending from the first link and a second slot structured to accommodate the protuberance extending from the second link. Each of the plurality of slots is defined with a groove in an inner periphery which defines the neutral position.

In an embodiment of the present disclosure, the pre-defined profile of each of the first slot and the second slot includes a cam profile and a linear profile extending on either side of the groove.

In an embodiment of the present disclosure, selectively operating the lever arm between at least one of the first position, the neutral position and the second position simultaneously toggles the drive disc thereby selectively actuating the pair of links to at least one of a first position, a neutral position and a second position.

In an embodiment of the present disclosure, the first switch is associate with a first source terminal and a load terminal of the double throw switch. The second switch is associated with a second source terminal and the load of the double throw switch.

In an embodiment of the present disclosure, toggling the lever arm from the neutral position to the first position actuates the first switch to a closed condition closing a circuit between the first source terminal and the load terminal. Toggling the lever arm from the neutral position to the second position actuates the second switch to a closed condition closing a circuit between the second source terminal and the load terminal.

In another non-limiting embodiment of the present disclosure, a double throw switch is disclosed. The double throw switch includes a support plate, an enclosure extending along a periphery of the support plate. A first source terminal and a second source terminal are supported on the support plate. Further, a load terminal is shorted to the first source terminal and the second source terminal. A first switch is associated with the first source terminal and the load terminal. Also, a second switch is associated with the second source terminal and the load terminal. The double throw switch includes an actuation assembly to toggle the first switch and the second switch between one of the first source terminal and the second source terminal with the load terminal. The assembly includes a pair of links of which a distal end of each of the pair of links is connectable to the first switch and the second switch and a proximal end of each of the pair of links comprises a protuberance extending perpendicular to a major surface of each of the pair of links. Further, a drive disc of the assembly is securable to a wall of the enclosure. The drive disc is defined with a plurality of slots of a pre-defined profile. Each of the plurality of slots is structured to accommodate and guide the protuberance extending from a corresponding link of the pair of links. A lever arm is connectable to the drive disc, wherein the lever arm is operable to at least one of a first position, a neutral position and a second position.

In an embodiment of the present disclosure, the first source terminal and the second source terminal are stacked one above the other with a support bracket provided on either ends to secure the first source terminal and the second source terminal one above the other.

In an embodiment of the present disclosure, the double throw switch includes an auxiliary link configured to connect the pair of links and the cover.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

The novel features and characteristics of the disclosure are set forth in the appended claims. The disclosure itself, however, as well as a mode of use, further objectives, and advantages thereof, will best be understood by reference to the following detailed description of embodiments when read in conjunction with the accompanying drawings. One or more embodiments are now described, by way of example only, with reference to the accompanying drawings wherein like reference numerals represent like elements and in which:

Figure 1:
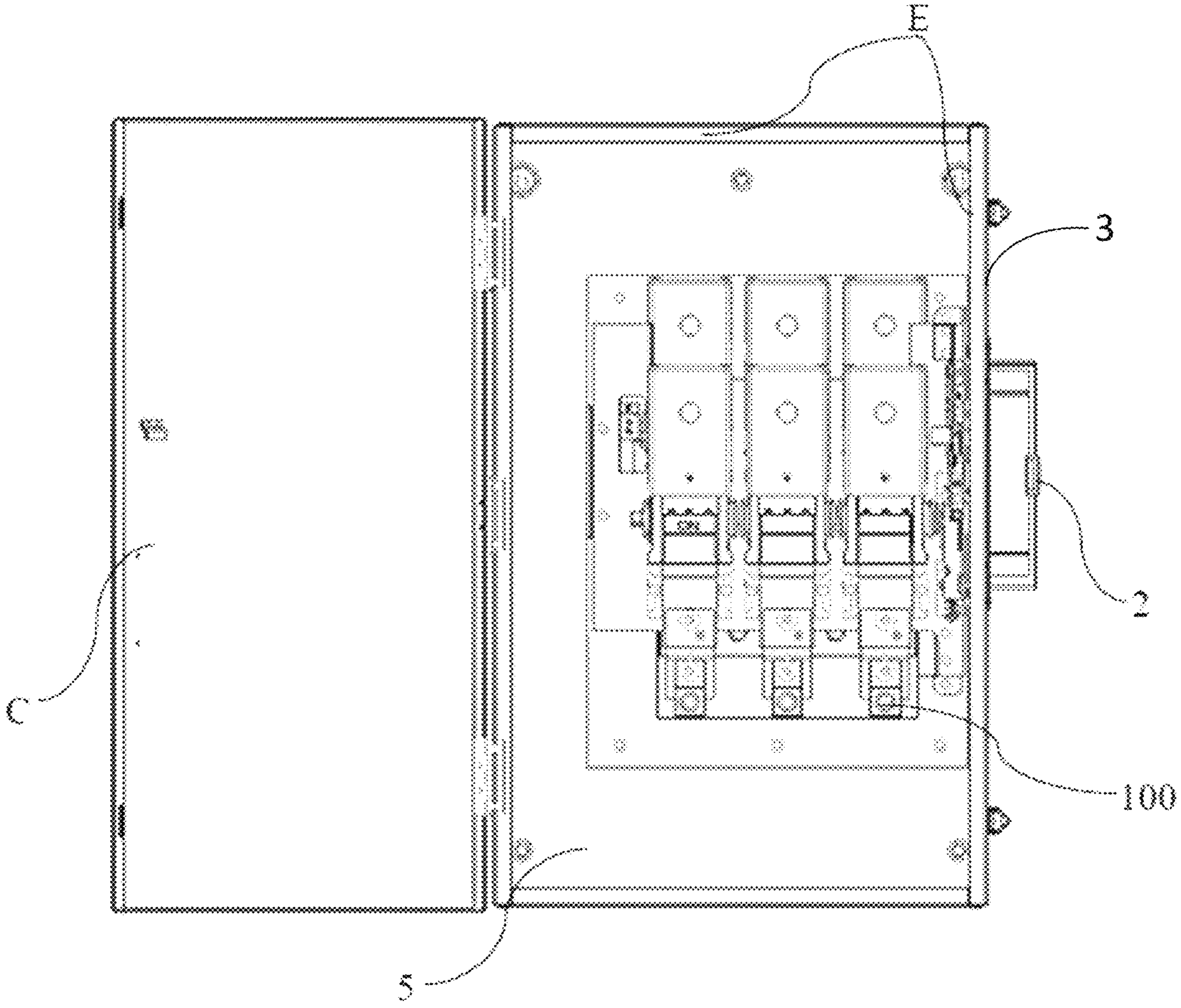
FIG. 1 is a schematic view of an enclosure accommodating a double throw switch and an actuation assembly, in accordance with an embodiment of the disclosure.

The figures depict embodiments of the disclosure for purposes of illustration only. One skilled in the art will readily recognize from the following description that alternative embodiments of the structures and methods illustrated herein may be employed without departing from the principles of the disclosure described herein

DETAILED DESCRIPTION

The foregoing has broadly outlined the features and technical advantages of the present disclosure in order that the description of the disclosure that follows may be better understood. Additional features and advantages of the disclosure will be described hereinafter which form the subject of the disclosure. It should be appreciated by those skilled in the art that the conception and specific embodiments disclosed may be readily utilized as a basis for modifying or designing other system for carrying out the same purposes of the present disclosure. It should also be realized by those skilled in the art that such equivalent constructions do not depart from the scope of the disclosure. The novel features which are believed to be characteristic of the disclosure, as to its organization, together with further objects and advantages will be better understood from the following description when considered in connection with the accompanying figures. It is to be expressly understood, however, that each of the figures is provided for the purpose of illustration and description only and is not intended as a definition of the limits of the present disclosure.

While the disclosure is susceptible to various modifications and alternative forms, specific embodiments thereof have been shown by way of example in the drawings and will be described below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof used in the disclosure, are intended to cover a non-exclusive inclusions, such that an assembly comprises a list of components does not include only those components but may include other components not expressly listed or inherent to such assemblies. In other words, one or more elements in assemblies proceeded by "comprises" does not, without more constraints, preclude the existence of other elements or additional elements in the system or device.

The following paragraphs describe the present disclosure with reference to FIGS. 1 to 5. In the figures, the same element or elements which have similar functions are indicated by the same reference signs. For the purposes of promoting an understanding of the principles of the disclosure, reference will now be made to specific embodiments illustrated in the drawings and specific language will be used to describe the same. It will nevertheless be understood that no limitation of the scope of the invention is thereby intended, such alterations and further modifications in the illustrated methods, and such further applications of the principles of the invention as illustrated therein being contemplated as would normally occur to one skilled in the art to which the invention pertains.

The following detailed description is merely exemplary in nature and is not intended to limit application and uses. Further, there is no intention to be bound by any theory presented in the preceding background or summary or the following detailed description. It is to be understood that the disclosure may assume various alternative orientations and step sequences, except where expressly specified to the contrary. It is also to be understood that the specific devices or components illustrated in the attached drawings and described in the following specification are simply exemplary embodiments of the inventive concepts defined in the appended claims. Hereinafter, preferred embodiments of the present disclosure will be described referring to the accompanying drawings. While some specific terms directed to a specific direction will be used, the purpose of usage of these terms or words is merely to facilitate understanding of the present invention referring to the drawings.

Accordingly, it should be noted that meaning of these terms or words should not improperly limit the technical scope of the present invention. Also, it is to be understood that the phraseology and terminology used herein is for the purpose of description and should not be regarded as limiting. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. It is to be understood that this disclosure is not limited to the specific devices, methods, applications, conditions, or parameters described and/or shown herein, and that the terminology used herein is for the purpose of describing particular embodiments by way of example and is not intended to be limiting of the claimed invention. In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Referring in general to all the figures, there is disclosed an exemplary embodiment of an actuation assembly for use in a double throw switch. The actuation assembly in the corresponding figures is depicted by referral numeral "10" (refer FIG. 5) and the double throw switch is depicted by referral numeral "100" (refer FIG. 2). The double throw switch 100 may hereinafter be referred as DT switch and may be used interchangeably. The DT switch 100 of the present disclosure may be of a SPDT or a DPDT configuration, where SP and DP refer to single pole and double pole and DT refers to double throw. The DT switch 100 may be configured for multiple phase connections. For example, the multiple phase connections may include utility connection and back-up having a common load terminal. In an embodiment, the DT switch 100 may be mounted within in an enclosure E (shown in FIG. 1). The enclosure E may extend along a periphery of a support plate 5 (shown in FIG. 1) defining a cabinet which may be designed to accommodate the DT switch 100. In an embodiment, the support plate 5 may be configured to securely accommodate the DT switch 100. Further, the enclosure E may include a cover C designed to enclose/cover the entire DT switch setup. In an embodiment, the cover C is configured to act as a door of the enclosure and may be selectively opened or closed to access the DT switch 100.

Figure 2:
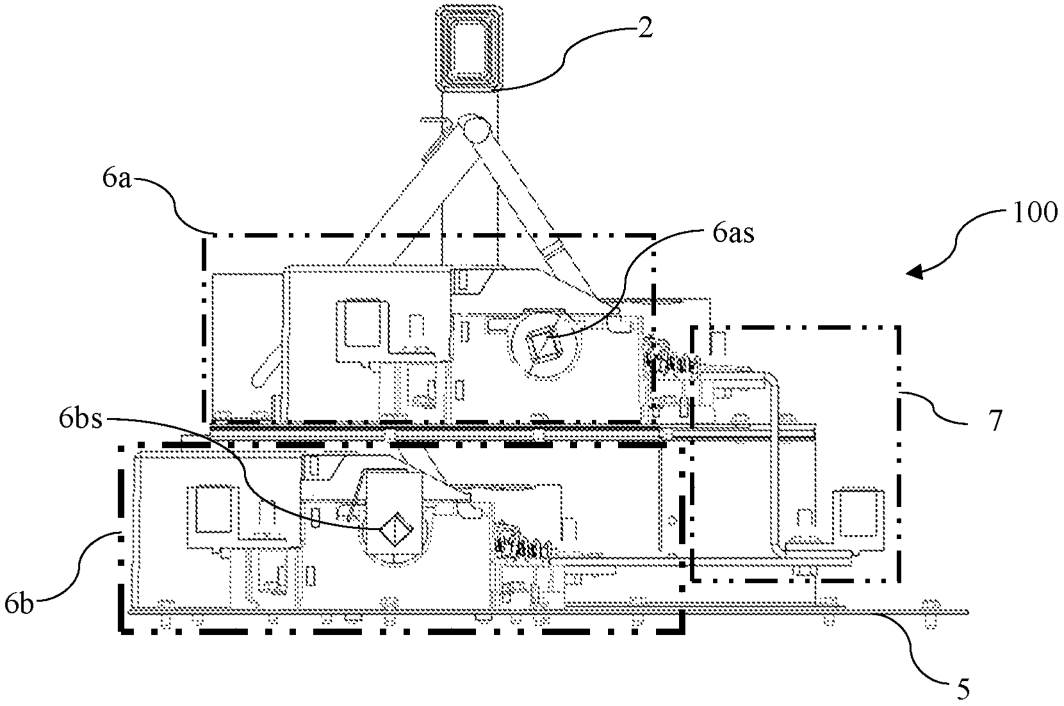
FIG. 2 is a side view of the double throw switch of FIG. 1 with the actuation assembly, in accordance with embodiments of the disclosure.

Referring now to FIG. 2, which depicts a side view of the DT switch 100 the DT switch 100 may be secured to the support plate 5. The DT switch 100 may be a two-switch apparatus that may be combined in one enclosure i.e., the enclosure E. The two-switch apparatus i.e., the DT switch 100 may include a first switch **6*as* and a second switch 6*bs*. In an embodiment, the first switch 6*as* may be associated with a first circuit of the DT switch 100 and the second switch 6*bs* may be associated with a second circuit of the DT switch 100. The first circuit may be designed to supply power from a first source to a load and the second circuit may be designed to supply power from a second source to the load. In an embodiment, the first source may be a utility power supply and the second source may be a back-up power supply but not limiting to the same. The first source may be connected to a first source terminal 6*a* and the second source may be connected to the second source terminal 6*b*. Further, the load may be connected to a load terminal 7. The first source terminal 6*a* and the second source terminal 6*b* may be shorted to the single load terminal 7. In an embodiment, the first source terminal 6*a* and the second source terminal 6*b* may be shorted to the load terminal 7 by a link made of copper but not limiting to the same. In an embodiment, the first source terminal 6*a* and the second source terminal 6*b* may be stacked one above other and may be secured in position by a support bracket S. In an embodiment, a fuse set (not shown) may be arranged on the load terminal end. The fuse set may be connected in common to the first source terminal 6*a* and the second source terminal 6*b* with the load terminal 7. Since, the first source terminal 6*a* and the second source terminal 6*b* are shorted to the single load terminal 7**, the configuration advantageously necessitates only one fuse set.

The first circuit includes a first switch **6*as* and the second circuit includes a second switch 6*bs*. The first circuit may be activated to an open condition/a closed condition by actuating the first switch 6*as*. Similarly, the second circuit may be activated to an open condition/closed condition by actuating the second switch 6*bs*. In an embodiment, actuating respective switches 6*as* and 6*bs* of the first circuit and the second circuit to the open condition breaks the connection between the source terminal 6*a* and 6*b* and the load terminal 7. Similarly, actuating respective switches 6*as* and 6*bs* of the first circuit and the second circuit to the closed condition forms connection between the source terminal 6*a* and 6*b* and the load 7. Here, the open condition refers to OFF mode of the switch and the closed condition refers to ON mode of the switch. The first switch 6*as* and the second switch 6*bs* may be actuated to the open condition/the closed condition by the actuation assembly 10 to which the switches 6*as* and 6*bs* are linked. In an embodiment, at any instance only the first switch 6*as* or the second switch 6*bs* may be in the closed condition. That is if the first switch 6*as* is in closed condition, the second switch 6*bs* is in open condition and vice-versa. Hereinafter, the actuation assembly 10 of the present disclosure may be elucidated with reference to FIG. 5 in conjunction with FIG. 1 to FIG. 4**.

Figure 3:
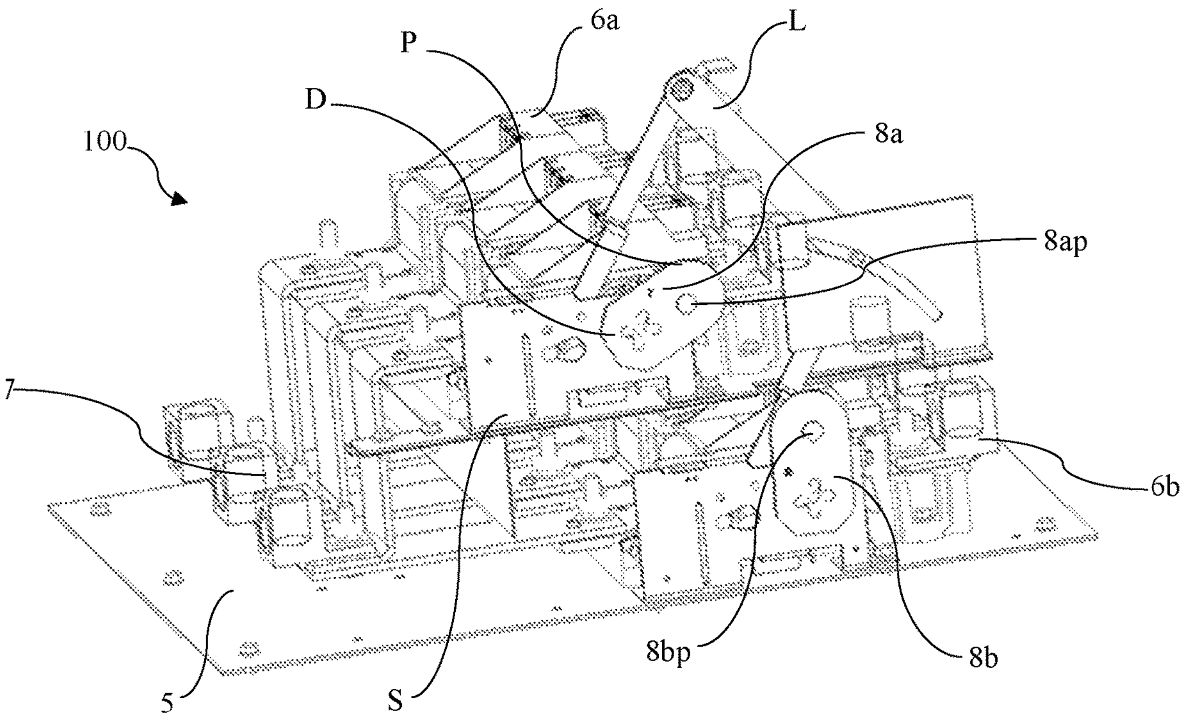
FIG. 3 is a perspective view of the double throw switch with the actuation assembly.
Figure 4:
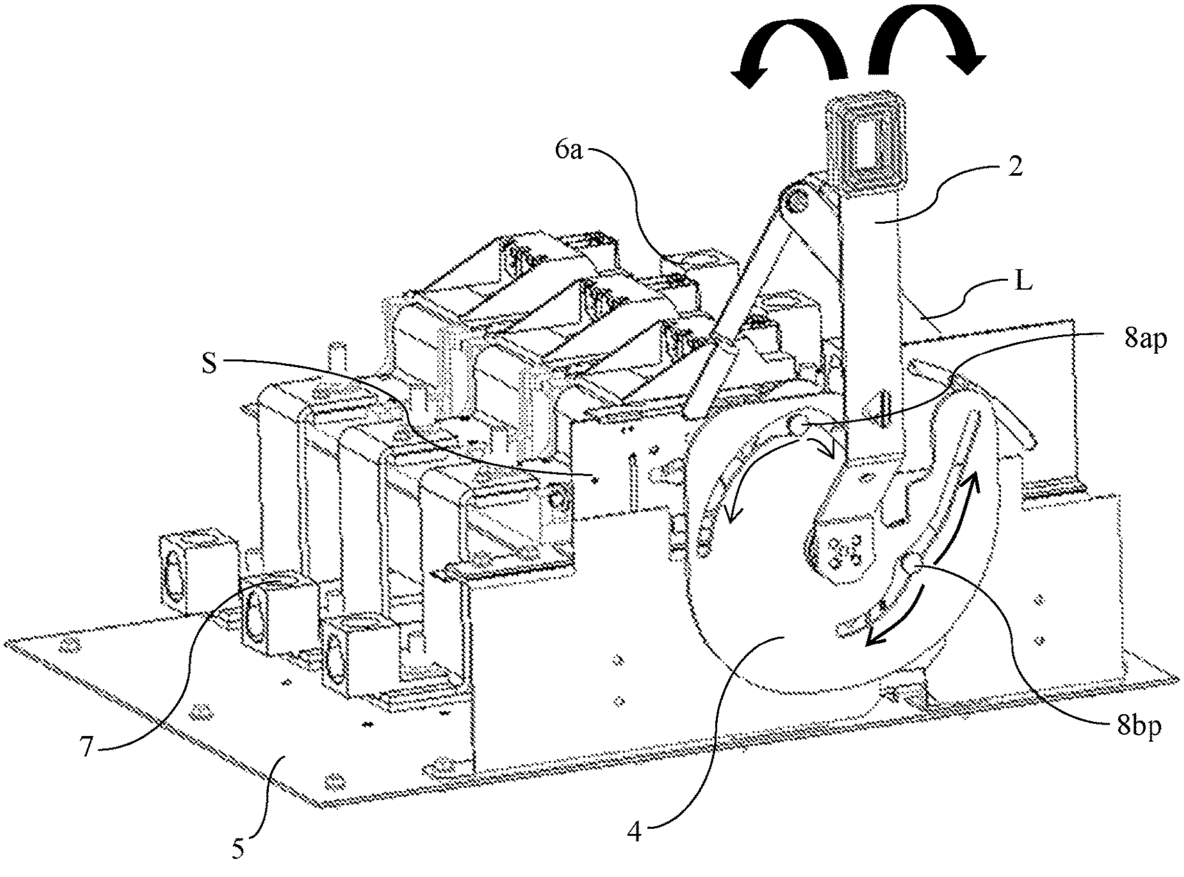
FIG. 4 is a perspective view of the double throw switch with the actuation assembly showing operation directions of the lever.
Figure 5:
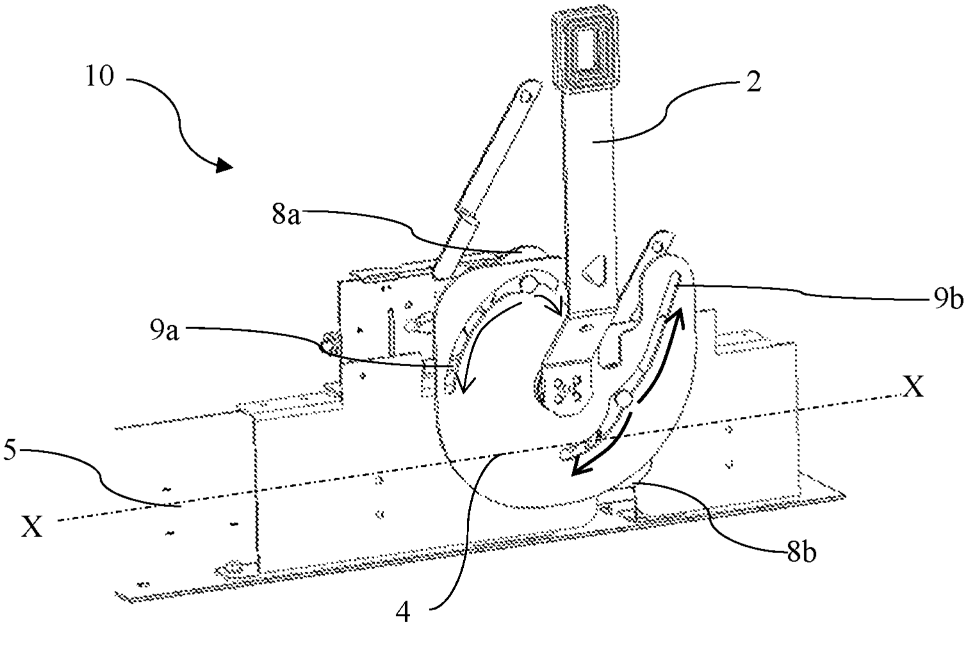
FIG. 5 is a perspective view of the actuation assembly employed in the double throw switch, in accordance with embodiments of the disclosure.

The actuation assembly 10 (as shown in FIG. 5) may be configured to selectively toggle the first switch **6*as* and the second switch 6*bs* to either the open condition or the closed condition. The actuation assembly 10 of the present disclosure may include a pair of links 8*a* and 8*b* (as shown in FIG. 3) which form a link between the switches 6*as* and 6*bs* and a drive disc 4. In an embodiment, the pair of links 8*a* and 8*b* may include a first link 8*a* and a second link 8*b*. The first link 8*a* and the second link 8*b* may be designed to be connectable to the first switch 6*as* and the second switch 6*bs* of the DT switch 100 respectively. A distal end D (shown in FIG. 3) of the first link 8*a* and the second link 8*b* is connected to the first switch 6*as* and the second switch 6*bs* respectively. The first link 8*a* may be connected to the first switch 6*as* at an acute angle with respect to a longitudinal axis X-X of the DT switch 100. The second link 8*b* may be connected to the second switch 6*bs* at 90° with respect to a longitudinal axis X-X of the DT switch 100. However, the angles should not be considered as a limitation of the present disclosure and the angles may vary based on requirements. In some embodiments, a proximal end P (as shown in FIG. 3) of the pair of links 8*a*. 8*b* may be defined with a protuberance 8*ap* and 8*bp*. The term "protuberance" used in the present disclosure refers to a projection or a protrusion projecting from a surface of an object (in this case the pair of links). The "protuberance" may be an external member such as pin or rivet fixed to the pair of links 8*a* and 8*b* or may be defined integrally in the pair of links 8*a* and 8*b*. The protuberance 8*ap* and 8*bp* may extend perpendicularly from a major surface of each of the pair of links 8*a* and 8*b*. In an embodiment, each of the pair of links 8*a* and 8*b* may be defined with two major surfaces, one of the major surface facing the DT switch 100 and the other major surface facing away from the DT switch 100 i.e., facing the drive disc 4. The protuberance 8*ap* and 8*bp* may extend perpendicularly from the major surface of each of the pair of links 8*a* and 8*b* facing away from the DT switch 100 (i.e., the major surface facing the drive disc 4). The protuberance 8***ap* and 8*bp* may be integrally defined with each of the pair of links 8*a*. 8*b*. In an embodiment, the protuberance 8*ap* and 8*bp* may be designed to have a head and a body. The head of the protuberance 8*ap* and 8*bp* may be accommodated in the corresponding link of the pair of links 8*a* and 8*b*. The body of the protuberance 8*ap* and 8*bp* may be secured to the proximal end P of the pair of links 8*a* and 8*b*. In some embodiments, the protuberance 8*ap* and 8*bp* may be an externally member secured to each of the pair of links 8*a* and 8*b*. The protuberance 8*ap* and 8*bp* may be designed to be accommodated in the drive disc 4. In an embodiment, the protuberance 8*ap* and 8*bp* may be designed to have a head and a body. The head of the protuberance 8*ap* and 8*bp* may be accommodated in the corresponding link of the pair of links 8*a* and 8*b*. The body of the protuberance 8*ap* and 8*bp* may be secured to the proximal end P of the pair of links 8*a* and 8*b*. In an embodiment, the drive disc 4 may be securable to a wall 3 of the enclosure E (shown in FIG. 1) of the double throw switch 100.

The drive disc 4 may be defined with a plurality of slots 9*a*, 9*b* (shown in FIG. 5) of a predefined profile. The plurality of slots 9*a*, 9*b* may include a first slot 9*a* and a second slot 9*b*. Each of the plurality of slots 9*a*, 9*b* may be defined with a groove on an inner periphery. The grooves in each of the plurality of slots 9*a*, 9*b* may define a neutral position of the actuation assembly 10. Also, the groove aids in assembling components of the actuation assembly 10 at the neutral position. In an embodiment, the pre-defined profile of each of the plurality of slots 9*a*, 9*b* includes a cam profile and a linear profile extending on either side of the groove. In an embodiment, each of the plurality of slots 9*a*, 9*b* may be designed to accommodate and guide the protuberance 8*ap*, 8*bp* extending from a corresponding link of the pair of links 8*a*, 8*b*. For example, the first slot 9*a* may accommodate the protuberance 8*ap* extending from the first link 8*a*. Similarly, the second slot 9*b* may be designed to accommodate the protuberance 8*bp* extending from the second link 8*b*. The protuberance 8*ap* and 8*bp* may be configured to slot into position during the actuation of the switches 6*as* and 6*bs*.

Further, the actuation of switches 6*as* and 6*bs* may be accomplished by operating a lever arm 2 of the actuation assembly 10. The lever arm 2 may be secured to the drive disc 4. In an embodiment, the lever arm 2 may be secured to the drive disc 4 at a substantially central portion of the drive disc 4. Also, the lever arm 2 may be secured to the drive disc 4 at right angle with respect to the longitudinal axis X-X of the double throw switch 100 to define a neutral position. In an embodiment, the lever arm 2 may be connected to the drive disc 4 from an outer end of the enclosure E. The lever arm 2 may be selectively operable to at least one of a first position and a second position from the neutral position (as shown by arrows in FIG. 4). Operating the lever arm 2 either to the first position or the second position from the neutral position concurrently drives/toggles the drive disc 4 to a first position and a second position. In an embodiment, toggling the drive disc 4 to either the first position and the second position guides the protuberance 8*ap* and 8*bp* with in the first slot 9*a* and the second slot 9*b*. As the first slot 9*a* and the second slot 9*b* is defined with a specific profile as described above in the present disclosure, when the protuberance 8*ap* and 8*bp* slides within the slots 9*a*, 9*b* (shown by arrows in FIGS. 4 and 5) it concurrently actuates either the first switch 6*as* or the second switch 6*bs*.

As described above, selectively operating the lever arm 2 between at least one of the first position, the neutral position and the second position simultaneously toggles the drive disc 4 to selectively actuate the pair of links 8*a*, 8*b* to at least one of a first position, a neutral position and a second position. For example, toggling the lever arm 2 from the neutral position to the first position (anti-clockwise movement as shown by arrow in FIG. 4) translates the force to drive disc 4, thereby moving the first switch 6*as* to the first position. When the drive disc 4 toggles from the neutral position to the first position, the protuberance 8*ap* associated with the first link 8*a* slides in the slot 9*a* of the plurality of slots 9*a* and 9*b*. The protuberance 8*ap* slides within the cam profile defined within the slot 9*a*. Sliding along the cam profile in the slot 9*a* forces the first switch 6*as* to move with the cam profile, thereby actuating the first switch 6*as* to the closed condition. Consequently, the protuberance 8*bp* associated with the second link 8*b* remains stationary as the curvilinear profile of the slot 9*b* slides along the protuberance 8*bp* without forcing the second switch 6*bs* to actuate. Thus, the second switch 6*bs* remains in the open condition while the first switch 6*as* is actuated to the closed condition. In the closed condition, connection is established between the first source terminal 6*a* and the load terminal 7. Similarly, toggling the first switch 6*as* to neutral position breaks the connection between the first source terminal 6*a* and the load terminal 7. During the movement of the lever arm 2 from neutral position to the first position only the first switch 6*as* may get actuated, the second switch 6*bs* does not nudge from its position or it remains in the open condition. Also, in the neutral position of the actuation assembly 10 neither the first switch 6*as* nor the second switch 6*bs* is actuated.

Similarly, when the lever arm 2 is toggled to the second position from the neutral position (clockwise movement as shown by arrow in FIG. 4) translates the force to drive disc 4, thereby moving the second switch 6*bs* to the second position. When the drive disc 4 toggles from the neutral position to the second position, the protuberance 8*bp* associated with the second link 8*b* slides in the slot 9*b* of the plurality of slots 9*a* and 9*b*. The protuberance 8*bp* slides within the cam profile defined within the slot 9*b*. Sliding along the cam profile within the slot 9*b* forces the second switch 6*bs* to move with the cam-profile, thereby actuating the second switch 6*bs* to the closed condition. Consequently, the protuberance 8*ap* associated with the first link 8*a* remains stationary as the curvilinear profile of the slot 9*a* slides along the protuberance 8*bp* without causing motion of the first switch 6*as*. Thus, the first switch 6*as* remains in open condition while the second switch 6*bs* is actuated to closed condition. In the closed condition, connection is established between the second source terminal 6*b* and the load terminal 7. Upon toggling the lever arm 2 from the second position to the neutral position, the second switch 6*bs* may be actuated to open condition which breaks connection between the second source terminal 6*b* and the load terminal 7.

In an embodiment, the actuation assembly 10 may include an auxiliary link L. The auxiliary link L may be in connection with the pair of links 8*a* and 8*b* and the switches 6*as* and 6*bs*. The auxiliary link L may be structured to act as a self-locking means for the cover C of the enclosure E. In an embodiment, the auxiliary link L is provided between the lever arm 2 and a part associated with the latch of the cover C of the enclosure E. The auxiliary link L may be configured to release the lever arm 2 to an operational condition once the cover C of the enclosure E is in a fully closed state.

In an embodiment, the actuation assembly 10 of the present disclosure is less complex and uses lesser number of parts. Since, the actuation assembly 10 uses lesser number of parts, the cost of manufacturing such assembly 10 is also less. The actuation assembly 10 of the present disclosure is reliable and easy to assemble. As the actuation assembly 10 of the present disclosure uses lesser number of parts, the space required by the DT switch 100 and the enclosure E is less than the conventional setup. Further, configuration of the DT switch 100 of the present disclosure requires lesser number of fuse sets than the conventional assemblies.

It is to be understood that a person of ordinary skill in the art may develop a system of similar configuration without deviating from the scope of the present disclosure. Such modifications and variations may be made without departing from the scope of the present invention. Therefore, it is intended that the present disclosure covers such modifications and variations provided they come within the ambit of the appended claims and their equivalents.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims e.g., bodies of the appended claims are generally intended as "open" terms e.g., the term "including" should be interpreted as "including but not limited to," the term "having" should be interpreted as "having at least," the term "includes" should be interpreted as "includes but is not limited to," etc., It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" e.g., "a" and/or "an" should typically be interpreted to mean "at least one" or "one or more"; the same holds true for the use of definite articles used to introduce claim recitations. In addition, even if a specific number of an introduced claim recitation is explicitly recited, those skilled in the art will recognize that such recitation should typically be interpreted to mean at least the recited number e.g., the bare recitation of "two recitations," without other modifiers, typically means at least two recitations, or two or more recitations. Furthermore, in those instances where a convention analogous to "at least one of A, B, and C, etc." is used, in general such a construction is intended in the sense one having skill in the art would understand the convention e.g., "a system 108 having at least one of A, B, and C" would include but not be limited to systems that have A alone, B alone, C alone, A and B together, A and C together, B and C together, and/or A, B, and C together, etc., In those instances, where a convention analogous to "at least one of A, B, or C, etc." is used, in general such a construction is intended in the sense one having skill in the art would understand the convention e.g., "a system 108 having at least one of A, B, or C" would include but not be limited to systems that have A alone, B alone, C alone, A and B together, A and C together, B and C together, and/or A, B, and C together, etc., It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Preferred embodiments are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Reference Numbers:

| Reference Number | Description |
|---|---|
| 10 | Actuation assembly |
| 2 | Lever arm |
| 4 | Drive disc |
| 5 | Support plate |
| 6a | First source terminal |
| 6b | Second source terminal |
| 6as | First switch |
| 6bs | Second switch |
| 7 | Load terminal |
| 8a | First link |
| 8b | Second link |
| 8ap and 8bp | Protuberance |
| 9a and 9b | Slots |
| S | Support bracket |
| P | Proximal end |
| D | Distal end |
| L | Auxiliary link |
| E | Enclosure |
| C | Cover |
| 100 | Double throw switch |

The invention claimed is:

1. An actuation assembly for a double throw switch, the assembly comprising:

a pair of links, wherein a distal end (D) of each of the pair of links is connectable to a first switch and a second switch of a double throw switch and a proximal end (P) of each of the pair of links comprises a protuberance extending perpendicular to a major surface of each of the pair of links facing away from the double throw switch;

a drive disc securable to a wall of the double throw switch, wherein the drive disc is defined by a plurality of slots of a predefined profile, each of the plurality of slots is structured to accommodate and guide the protuberance extending from a corresponding link of the pair of links; and a lever arm connectable the drive disc, wherein the lever arm being operable to at least one of a first position, a neutral position, and a second position.

2. The assembly as claimed in claim 1, wherein the plurality of slots includes a first slot structured to accommodate the protuberance extending from the first link and a second slot structured to accommodate the protuberance extending from the second link.

3. The assembly as claimed in claim 1, wherein each of the plurality of slots is defined with a groove in an inner periphery, wherein the groove defines the neutral position.

4. The assembly as claimed in claim 2, wherein the predefined profile of each of the first slot and second slot includes a cam profile and a linear profile extending on either side of the groove.

5. The assembly (10) as claimed in claim 1, wherein selectively operating the lever arm (2) between at least one of the first position, the neutral position and the second position simultaneously toggles the drive disc (4) thereby selectively actuating the pair of links (**8*a*, 8*b***) to at least one of a first position, a neutral position and a second position.

6. The assembly as claimed in claim 1, wherein the pair of links include a first link connectable to the first switch and a second link connectable to the second switch.

7. The assembly as claimed in claim 6, wherein the first link is connected to the first switch at an acute angle with respect to a longitudinal axis (X-X) of the double throw switch.

8. The assembly as claimed in claim 1, wherein the first switch is associated with a first source terminal and a load terminal, and the second switch is associated with a second source terminal and the load terminal of the double throw switch.

9. The assembly as claimed in claim 8, wherein toggling the lever arm from the neutral position to the first position actuates the first switch to a closed condition closing a circuit between the first source terminal and the load terminal.

10. The assembly as claimed in claim 8, wherein toggling the lever arm from the neutral position to the second position actuates the second switch to a closed condition closing a circuit between the second source terminal and the load terminal.

11. A double throw switch comprising:

a support plate;

an enclosure (E) extending along a periphery of the support plate;

a first source terminal and a second source terminal supported on the support plate;

a load terminal shorted to the first source terminal and the second source terminal;

a first switch associated with the first source terminal and the load terminal;

a second switch associated with the second source terminal and the load terminal; and an actuation assembly to toggle the first switch and the second switch between one of the first source terminal and the second source terminal with the load terminal, the assembly comprising:

a pair of links, wherein a distal end (D) of each of the pair of links is connectable to the first switch and the second switch and a proximal end (P) of each of the pair of links comprises a protuberance extending perpendicular to a major surface of each of the pair of links facing away from the double throw switch;

a drive disc securable to a wall of the enclosure, wherein the drive disc is defined with a plurality of slots of a predefined profile, each of the plurality of slots is structured accommodate and guide the protuberance extending from a corresponding link of the pair of links; and a lever arm connectable the drive disc, wherein the lever arm being operable to at least one of a first position, a neutral position, and a second position.

12. The double throw switch as claimed in claim 11, wherein the first source terminal and the second source terminal are stacked one above the other with a support bracket(S) provided on either ends to secure the first source terminal (6*a*) and the second source terminal one above the other.

13. The double throw switch as claimed in claim 11, wherein toggling the lever arm from the neutral position to the first position actuates the first switch to a closed condition closing a circuit between the first source terminal and the load terminal.

14. The double throw switch as claimed in claim 11, wherein toggling the lever arm from the neutral position to the second position actuates the second switch to a closed condition closing a circuit between the second source terminal and the load terminal.

15. The double throw switch as claimed in claim 11 further comprising an auxiliary link (L) configured to connect the pair of links and a cover (C) of the enclosure (E).

* * * * *